US010039072B2

(12) United States Patent
Chamarty et al.

(10) Patent No.: US 10,039,072 B2
(45) Date of Patent: *Jul. 31, 2018

(54) SYSTEM AND METHOD FOR PROVIDING POWER SAVING MODE ENHANCEMENTS IN A NETWORK ENVIRONMENT

(71) Applicant: CISCO TECHNOLOGY, INC., San Jose, CA (US)

(72) Inventors: Ravi Shankar Chamarty, Hopkinton, MA (US); Maulik Vijay Vaidya, Atlanta, GA (US); Nirav Salot, Pune (IN); Sridhar Bhaskaran, Coimbatore (IN); Vivek Jha, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,814

(22) Filed: Jun. 22, 2017

(65) Prior Publication Data
US 2017/0295557 A1    Oct. 12, 2017

Related U.S. Application Data

(63) Continuation of application No. 14/746,947, filed on Jun. 23, 2015, now Pat. No. 9,730,156, which is a continuation of application No. 14/741,281, filed on Jun. 16, 2015, now Pat. No. 9,699,725.

(60) Provisional application No. 62/077,091, filed on Nov. 7, 2014.

(51) Int. Cl.
H04W 60/04    (2009.01)
H04L 29/08    (2006.01)

(52) U.S. Cl.
CPC ............. *H04W 60/04* (2013.01); *H04L 67/16* (2013.01)

(58) Field of Classification Search
CPC .............................. H04L 67/16; H04W 60/04
See application file for complete search history.

(56) References Cited

U.S. PATENT DOCUMENTS

| 7,417,971 | B2 | 8/2008 | Jeong et al. |
| 9,699,725 | B1* | 7/2017 | Chamarty ......... H04W 52/0209 |
| 9,730,156 | B1* | 8/2017 | Chamarty ......... H04W 52/0209 |
| 2012/0106423 | A1 | 5/2012 | Nylander |
| 2012/0115454 | A1 | 5/2012 | Liao |
| 2012/0191842 | A1* | 7/2012 | Hu ........................ H04L 47/782 709/224 |
| 2013/0028097 | A1 | 1/2013 | Barrett |

(Continued)

Primary Examiner — Jianye Wu
(74) Attorney, Agent, or Firm — Patterson + Sheridan, LLP

(57) ABSTRACT

A method is provided in one example embodiment and may include determining that a periodic timer for a user equipment (UE) is about to expire; communicating to an application service, prior to expiration of the periodic timer for the UE, an indication associated with an availability of the UE to receive data from the application service; and communicating the data from the application service to the UE upon receiving the indication. In some cases, the method can include registering, by the application service, to receive the indication from a Mobility Management Entity (MME) or a serving General Packet Radio Service (GPRS) support node (SGSN), wherein the registering is performed via a service capability exposure function (SCEF) in communication with the MME or the SGSN and the application service.

20 Claims, 9 Drawing Sheets

(56) References Cited

U.S. PATENT DOCUMENTS

| | | |
|---|---|---|
| 2013/0258890 A1 | 10/2013 | Li et al. |
| 2014/0016614 A1* | 1/2014 | Velev .................... H04W 4/005 370/331 |
| 2014/0105028 A1* | 4/2014 | Bhaskaran, Sr. ..... H04W 48/18 370/242 |
| 2014/0235226 A1 | 8/2014 | Pinheiro et al. |
| 2014/0321365 A1 | 10/2014 | Shoji |
| 2016/0007316 A1 | 1/2016 | Vaidya |

* cited by examiner

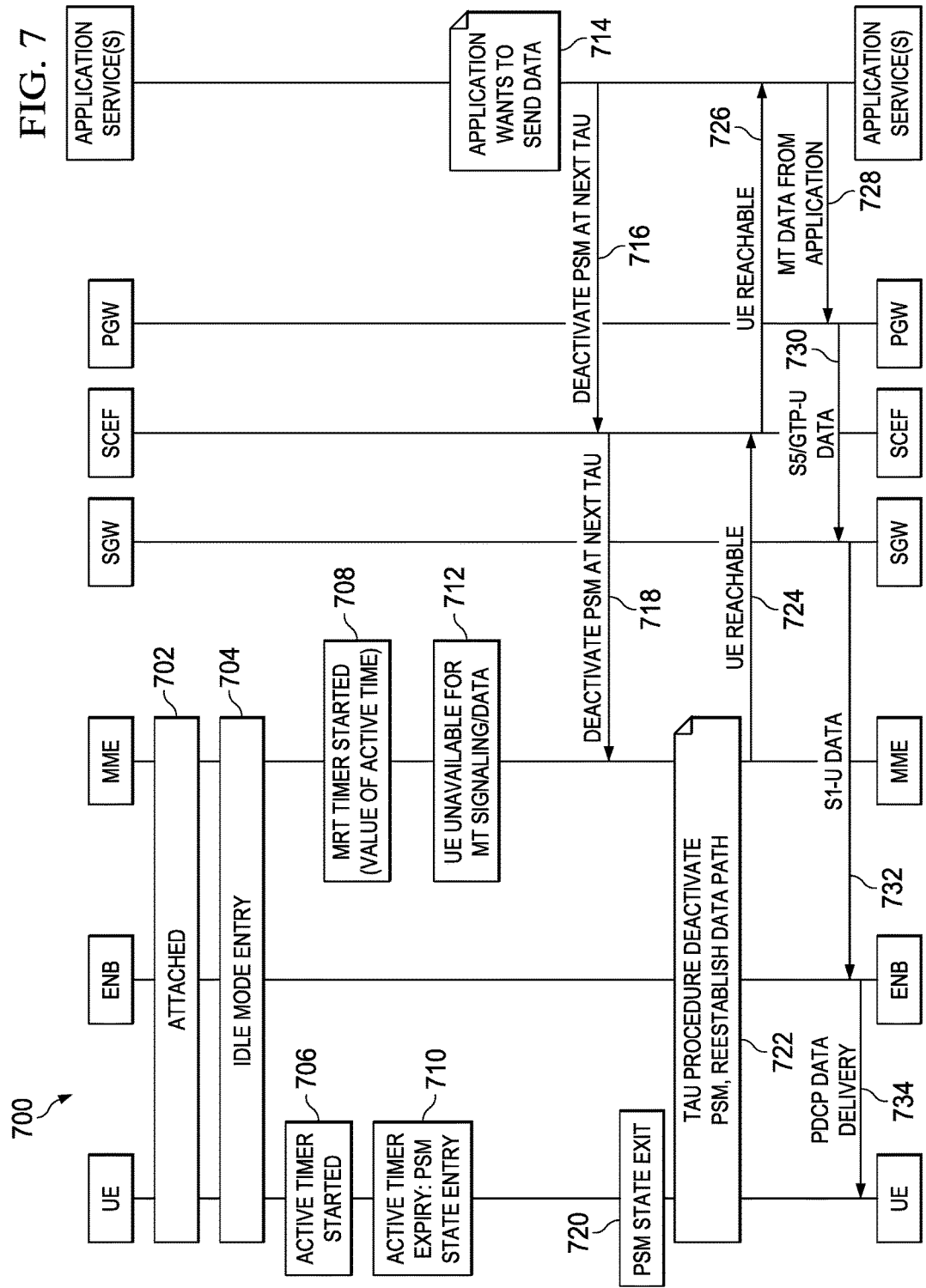

SYSTEM AND METHOD FOR PROVIDING POWER SAVING MODE ENHANCEMENTS IN A NETWORK ENVIRONMENT

CROSS-REFERENCE TO RELATED APPLICATIONS

This Application is a continuation (and claims the benefit of priority under 35 U.S.C. § 120) of U.S. application Ser. No. 14/746,947, filed on Jun. 23, 2015, entitled "SYSTEM AND METHOD FOR PROVIDING POWER SAVING MODE ENHANCEMENTS IN A NETWORK ENVIRONMENT," Inventors Ravi Shankar Chamarty, et al., which application is a continuation (and claims the benefit of priority under 35 U.S.C. § 120) of U.S. patent application Ser. No. 14/741,281, filed Jun. 16, 2015, entitled "SYSTEM AND METHOD FOR PROVIDING POWER SAVING MODE ENHANCEMENTS IN A NETWORK ENVIRONMENT," Inventors Ravi Shankar Chamarty, et al. The disclosure of the prior applications are considered part of (and are incorporated in its entirety by reference in) the disclosure of this application. This application claims the benefit of priority under 35 U.S.C. § 119(e) to U.S. Provisional Application Ser. No. 62/077,091, entitled "SYSTEM AND METHOD FOR PROVIDING POWER SAVING MODE CAPABILITIES IN A NETWORK ENVIRONMENT" filed Nov. 7, 2014, which is hereby incorporated by reference in its entirety.

TECHNICAL FIELD

This disclosure relates in general to the field of communications and, more particularly, to a system and method for providing power saving mode (PSM) mode enhancements in a network environment.

BACKGROUND

Networking architectures have grown increasingly complex in communications environments, particularly mobile wireless environments. Mobile communication networks have grown substantially in subscriber base as end users become increasingly connected to mobile wireless environments to conduct business, to shop, to interact with friends, to maintain personal finances, and to perform many other daily functions. As the number of mobile subscribers increases, efficient management of communication resources becomes more critical. In some instances, user equipment can be power saving mode (PSM) enabled, which allows the user equipment to conserve power resources while maintaining a connection to the network. However, when in PSM mode, user equipment is unable to receive traffic for mobile terminated services, which can cause such traffic to be rejected for delivery to the user equipment. Hence, there are significant challenges in managing the delivery of traffic to PSM enabled user equipment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a simplified flow diagram illustrating yet other potential flows and activities associated with providing PSM enhancements in accordance with one potential embodiment of the communication system.

DETAILED DESCRIPTION OF EXAMPLE EMBODIMENTS

Overview

A method is provided in one example embodiment and may include determining that a periodic timer for a user equipment (UE) is about to expire; communicating to an application service, prior to expiration of the periodic timer for the UE, an indication associated with an availability of the UE to receive data from the application service; and communicating the data from the application service to the UE upon receiving the indication. In some cases, the method can include registering, by the application service, to receive the indication from a Mobility Management Entity (MME) or a serving General Packet Radio Service (GPRS) support node (SGSN), wherein the registering is performed via a service capability exposure function (SCEF) in communication with the MME or the SGSN and the application service. In some instances, the registering can include subscribing by the application service to an event trigger for the MME or the SGSN.

In some cases, the method can include configuring a mobile reachability timer for the MME or the SGSN, where the mobile reachability timer is associated with the event trigger and the periodic timer for the UE. In some instances, the periodic timer can be associated with a Tracking Area Update (TAU) timer or a Routing Area Update (RAU) timer for the UE. In still some cases communicating the data to the UE can include paging the UE by the MME or the SGSN to receive the data from the application service and in other cases data can be communicated to the UE without paging the UE.

Another method is provided in another example embodiment and may include deactivating, by a MME or a SGSN a power saving mode (PSM) for a user equipment (UE); communicating an indication to an application service, upon deactivation of the PSM for the UE, that the UE is available to receive data; and communicating the data to the UE from the application service upon receiving the indication. In some cases, the other method can include subscribing, by the application service, to a trigger for the MME or the SGSN, wherein the trigger is associated with one or more operations to be performed by the MME or the SGSN to perform the deactivating. In some instances, the subscribing is performed via a Service Capability Exposure Function in communication with the application service and the MME or the SGSN.

In still some cases, the other method can include receiving, by the MME or the SGSN, an indication of a Tracking Area Update (TAU) or a Routing Area Update (RAU) for the UE. In some instances, the deactivating can be performed after receiving the indication of the TAU or the RAU for the UE. In still some cases, the other method can include activating the PSM for the UE upon completion of the data being communicated to the UE. In some instances, the activating can include communicating a time to the UE associated with a Tracking Area Update (TAU) timer or a Routing Area Update (RAU) timer.

Example Embodiments

Figure 1:
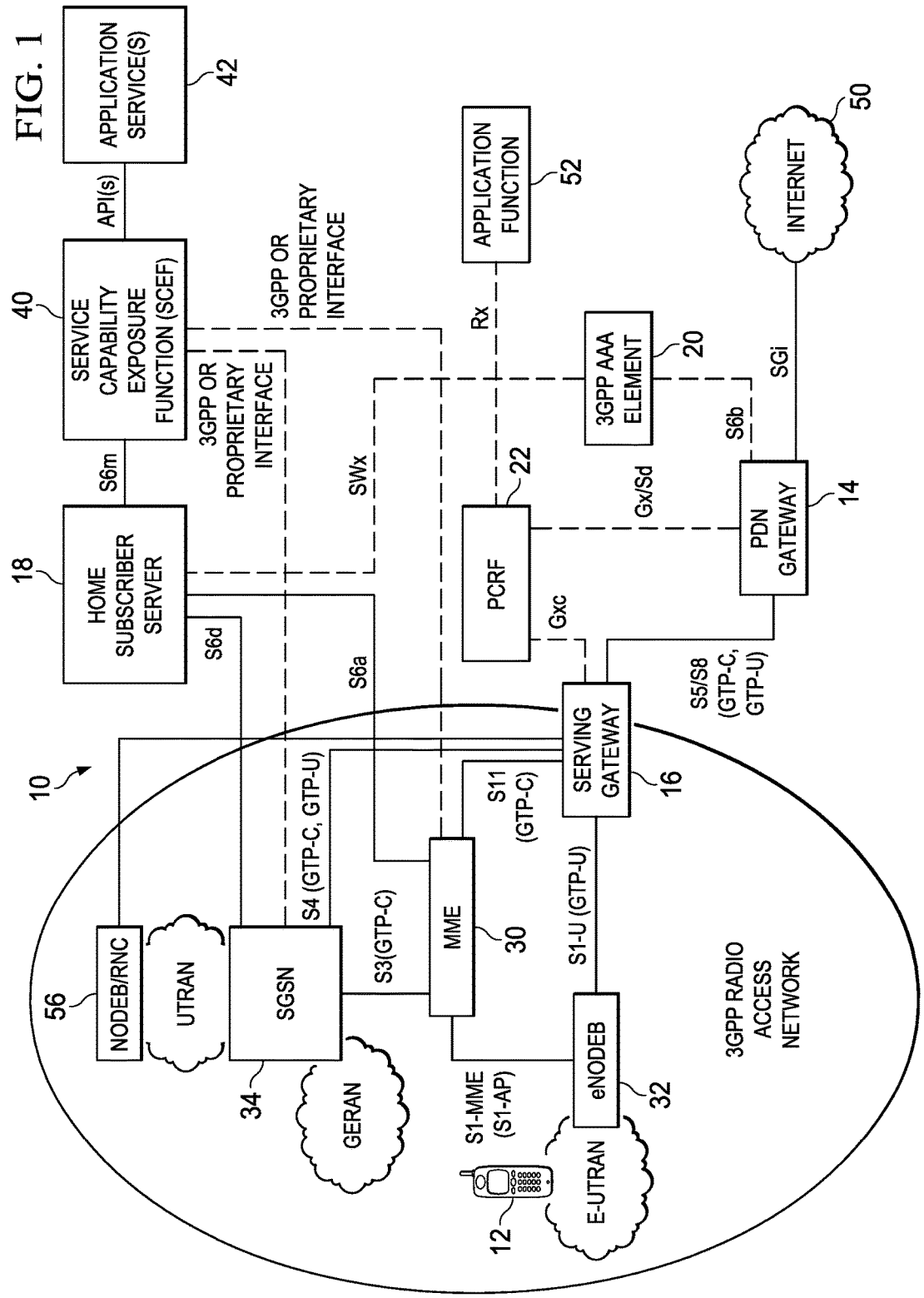
FIG. 1 is a simplified block diagram illustrating a communication system to facilitate providing PSM enhancements in network environment according to one embodiment of the present disclosure.

Turning to FIG. 1, FIG. 1 is a simplified block diagram illustrating a communication system 10 to facilitate providing power saving mode (PSM) enhancements in a network environment according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally.

The example architecture of FIG. 1 may include an end user operating user equipment (UE) 12 and a packet data network (PDN) gateway (PGW) 14, which may have a logical connection to a serving gateway (SGW) 16. Also provided are a home subscriber server (HSS) 18, a 3GPP Authentication, Authorization and Accounting (AAA) element 20, a Mobility Management Entity (MME) 30, an evolved Node B (eNodeB) 32, a serving General Packet Radio Service (GPRS) support node (SGSN) 34, a Service Capability Exposure Function (SCEF) 40, one or more Application Service(s) 42 and a Node B/Radio Network Controller (NodeB/RNC) 56. SGW 16 also has a logical connection to eNodeB 32, MME 30 and to SGSN 34. Both SGW 16 and PGW 14 can interface with a Policy and Charging Rules Function (PCRF) 22, which may also interface with an Application Function (AF) 52. Also shown in FIG. 1 is an internet 50.

As used herein in this Specification, the terms 'user equipment,' 'mobile node', 'user' and 'subscriber' are interchangeable. As further used herein in this Specification, the terms 'eNodeB' and 'eNB' can be used interchangeably.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In more general terms, 3GPP defines the Evolved Packet System (EPS) as specified in Technical Specification (TS) 23.401, TS 29.272, etc. The EPS generally consists of UE access networks and an Evolved Packet Core (EPC). Access networks may be 3GPP radio access networks, as shown in FIG. 1, including legacy access networks such as GSM EDGE Radio Access Network (GERAN), Universal Mobile Telecommunications Systems (UMTS) Terrestrial Radio Access Network (UTRAN), also known as 3G, or LTE access networks such as Evolved UTRAN (E-UTRAN), also known as 4G/LTE or LTE-Advanced (LTE-A), or they may be non-3GPP IP access networks such as digital subscriber line (DSL), Cable, WiMAX, WiFi, or the Internet. In various embodiments, NodeB/RNC 56 may provide cellular coverage for 2G and/or 3G radio access networks (RANs) (e.g., UTRAN, GERAN).

In general, UE 12 can be associated with a client, customer or device wishing to initiate a flow in communication system 10 via some network. The terms 'user equipment', 'mobile node', 'end user', 'and 'subscriber' are inclusive of devices used to initiate a communication, such as a computer, a parking meter, a power meter, a personal digital assistant (PDA), a laptop or electronic notebook, a cellular telephone, an i-Phone®, i-Pad®, a Google® Droid® phone, an IP phone, or any other device, component, element, or object capable of initiating voice, audio, video, media, and/or data exchanges within communication system 10. UE 12 may also be inclusive of a suitable interface to the human user such as a microphone, a display, a keyboard, or other terminal equipment. UE 12 may also be any device that seeks to initiate a communication on behalf of another entity or element such as a program, a database, or any other component, device, element, or object capable of initiating an exchange within communication system 10. Data or information, as used herein in this Specification, refers to any type of numeric, voice, video, media, or script data or information, or any type of source or object code, or any other suitable information in any appropriate format that may be communicated from one point to another. In certain embodiments, UE 12 may have a bundled subscription for network access and services (e.g., voice, data, etc.), which may be provided by a service provider and/or network operator via Application Service(s) 42. IP addresses can be assigned using dynamic host configuration protocol (DHCP), Stateless Address Auto-configuration, default bearer activation, etc., or any suitable variation thereof.

Among other things, MME 30 may provide tracking area list management, idle mode UE tracking, bearer activation and deactivation, serving gateway and packet data network gateway selection for UEs and authentication services. As shown in FIG. 1, MME 30 may be in communication with SGSN 34, eNodeB 32, HSS 18 and SGW 16. In general, eNodeB 32 is responsible for selecting an MME for user equipment, managing radio resources, and making handover decisions for user equipment for E-UTRAN access networks. NodeB/RNC 56 may provide similar functions for user equipment for UTRAN and/or GERAN access networks. HSS 18 may include one or more databases containing user-related and subscription-related information. HSS 18 may perform functionalities such as mobility management, call and session establishment support, user authentication and access authorization for 3GPP access. SGW 16 is a data plane element that can route and forward user data packets, while also acting as a mobility anchor for the user plane during inter-eNodeB handovers and as an anchor for mobility between LTE and other 3GPP technologies. SGW 16 may further be in communication with PGW 14. SGSN 34 may provide access and similar functions as MME 30 for legacy UMTS network devices. For example, UE on the GERAN can communicate through the SGSN to the SGW or the PGW, which can include a gateway GPRS support node (GGSN) to support communication with legacy systems.

Given the similarity of operation of MME 30 (for 4G access networks) and SGSN 34 (for 2G/3G access networks), operations, activities, functions, flows, etc. described herein for communications system 10 may be performed similarly by MME 30 and SGSN 34; and, in some cases, MME 30 and SGSN 34 can be referred to collectively using the label 'MME/SGSN'.

PGW 14 may provide Internet protocol (IP) connectivity access network (IP-CAN) session connectivity for UEs (e.g., UE 12) to one or more external packet data networks (PDNs), such as, for example, internet 50. PGW 14 may also serve as policy enforcement points to manage QoS, online/offline flow-based charging, data generation, deep-packet inspection and intercept.

PCRF 22 may be in communication with PGW 14, SGW 16, and Application function (AF) 52. PCRF 22 may aggregate information to and from the network, operational systems, and other sources in real-time, supporting the creation of policy charging and control (PCC) rules and then automatically making policy decisions for each subscriber such as, for example, quality of service (QoS) level decisions and charging rule decisions. PCRF 22 can be configured to use user-related and subscription-related information as a basis for the policy and charging control decisions. In some embodiments, PCRF 22 may determine PCC rules based on an application or service described to the PCRF from Application Function (AF) 52.

3GPP AAA element 20 is a network element responsible for accounting, authorization and authentication functions for UE 12. For AAA considerations, 3GPP AAA element 20 may provide a mobile node IP address and the accounting session identification and other mobile node states in appropriate messaging (e.g., via access-Request/access-Response messages). Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service. Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In various embodiments, communication system 10 may be provisioned with other AAA services and/or AAA servers, which may provide AAA considerations for the system.

Application Service(s) 42 may be provided in a service provider and/or network operator domain external to the 3GPP domain elements of communication system 10 (e.g., PGW 14, SGW 16, MME 30, etc.). In various embodiments, Application Service(s) can be used to provision various value added services (e.g., voice, data, etc.) that may be provided to UE by a service provider and/or network operator. In various embodiments, operation of Application Service(s) 42 may be enabled using one or Application Programming Interface (API) procedure calls as configured by a service provider and/or network operator for Application Service(s) 42 and/or SCEF 40. The API procedure calls may be communicated to SCEF 40 via one or more API interface(s).

In general terms, Service Capability Exposure Function (SCEF) 40 may provide a generic framework for third party applications (e.g., Application Service(s) 42) provided by a network operator and/or service provider to access 3GPP network capabilities via what 3GPP defines to be external interfaces (e.g., Sh, Rx, etc.). The SCEF framework was created to address 3GPP Release 13 (Rel-13) Service Exposure requirements. Other details of the SCEF framework are described in 3GPP Technical Report (TR) 23.708.

Also provided in the architecture of FIG. 1 is a series of interfaces, which can offer mobility, policy control, AAA functions and/or charging activities (offline and online) for various network elements. For example, interfaces can be used to exchange point of attachment, location, and/or access data for one or more end users, for example, a user operating UE 12. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include DIAMETER-based protocols, a service gateway interface (SGI), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), GTP version 2 (GTPv2), Generic Route Encapsulation (GRE), etc.

As shown in FIG. 1, a DIAMETER-based interface, Rx, may be maintained between Application Function (AF) 52 and PCRF 22 for communicating subscriber information between IP services provided by a service provider and PCRF 22. In various embodiments, the Rx interface can be DIAMETER-based or DIAMETER-based from the PCRF and representational state transfer (also referred to generally as 'RESTful') Extensible Markup Language (XML) over Hypertext Transfer Protocol (HTTP) from the AF through a DIAMETER to RESTful Rx protocol converter (not shown). In various embodiments, IP services can include an IP multimedia subsystem (IMS) to provide IP multimedia services to subscribers. PCRF 22 may provision policy charging and control (PCC) rules for PGW 14 using a DIAMETER-based Gx/Sd interface and PGW 14 may communicate subscriber information to PCRF 22 over the Gx/Sd interface. A 3GPP standards-based or proprietary interface may be provisioned between SCEF 40 and MME 30. A 3GPP standards-based or proprietary interface may also be provisioned between SCEF 40 and SGSN 34.

Communication system 10 may be configured with additional DIAMETER-based interfaces to manage policy and control between various elements of the system 10. For example, DIAMETER-based interface Gxc may be maintained between the PCRF 22 and SGW 16. Further DIAMETER-based interfaces may include SWx (interfacing 3GPP AAA element 20 and the HSS 18). Various additional interfaces may include an S6a interface between HSS 18 and MME 30; an S6d interface between HSS 18 and SGSN 34; an S6b interface between 3GPP AAA element 20 and PGW 14; an S6m interface between SCEF 40 and HSS 18; an S5/S8 interface between SGW 16 and PGW 14; and an S1-MME interface between MME 30 and eNodeB 32. Other signaling interfaces are illustrated between various components of FIG. 1, according to 3GPP standards, which are not discussed in detail for purposes of brevity.

Before detailing further operations and infrastructure of various elements of FIG. 1, certain contextual information is provided to offer an overview of some problems that may be encountered in providing PSM enhancements in a network environment. Such information is offered earnestly and for teaching purposes only and, therefore, should not be construed in a way to limit the broad applications for the present disclosure.

In 3GPP Release 12 (Rel-12), a UE Power saving mode (PSM) feature was introduced. This feature allowed a PSM capable UE to enter a state similar to power-off while retaining its registration with the network. A PSM capable UE can deactivate its Access Stratum functions and can stop all idle mode procedures in a PSM state but can continue to run any NAS timers that may apply such as periodic tracking area update (TAU) or routing area update (RAU) timers. This implies that the UE is not available for mobile terminating (MT) services such as data transfer or signaling. However, upon exiting the PSM state, the UE need not re-attach or re-establish packet data network (PDN) connections and can thereby achieves reduction in radio and core network signaling. Mobile originating activity may be resumed anytime by the UE exiting the PSM state.

In general, user equipment can be in PSM mode for any amount of time ranging on the order of seconds to hours. The MME/SGSN servicing a given PSM capable UE is aware of an Active Time granted to the UE and, during a PSM state for the UE, immediately rejects all downlink communication which requires the UE to be paged. Such rejections can span a number of interfaces such as SGs between the MME and a Visitor Location Register (VLR), SGd between the MME and a Short Message Service Center (SMSC) and S11/S4 between the MME/SGSN the SGW. In the case of S11 signaling, a GTPv2 rejection cause code #90 (UE UNREACHABLE) is communicated from the MME to the SGW when the UE is a PSM state. This cause code is also used for normal cases when the MME can't reach the UE for downlink transmissions, for example, due to UE's battery abruptly being pulled off (e.g., detach procedures aren't executed properly). Accordingly, upstream nodes (e.g., SGW, PGW, etc. involved in downlink communications to UE) can't distinguish why a given UE is unreachable.

Additionally, Application Services (AS) accessing a PSM capable UE do not have exposure to network-based states of the UE and may attempt to send mobile terminated (MT) to the UE when it is in a PSM state. Such mobile terminated (MT) traffic may be frequently rejected for delivery to UE by the MME/SGSN servicing the PSM capable UE. Packet drop for best effort PDNs is quite normal in an LTE network. However, in the case of a PSM capable UE being in a PSM state, because the UE may be "unavailable for paging" for extended duration, the following side-effects can be observed:

A) The SGW may have to unnecessarily buffer data until exhausting its re-try transmission strategy;

B) During such time, there may be unnecessary signaling between the SGW and the MME (e.g., S11 signaling), and between the SGW and the SGSN (e.g., S4 signaling); and/or C) If a sending entity (e.g., AS) isn't made aware of a UE's PSM state, then, depending on the application layer protocol used between UE and AS communications, the sending entity (e.g., AS) may continue to send MT data which will aggravate signaling in the network.

In addition, the 3GPP network may need a mechanism to trigger the AS to re-deliver its originally intended data. These frequent exchanges do not add value and may contribute to network congestion. There is a desire to solve problems related to downlink reachability by equipment manufacturers, service providers, network operators, etc. for 3GPP Release 13 (Rel-13), which is in development.

In accordance with various embodiments described herein, communication system 10 can overcome the aforementioned shortcomings (and others) by providing solutions that can include techniques for Application Service(s) 42 to subscribe to one or more triggers via SCEF 40 and MME 30/SGSN 34, which can be used to provide Application Service(s) 42 with an awareness of when a given PSM capable UE can be reached via MME 30/SGSN 34 to receive mobile terminated (MT) data.

In various embodiments, the solutions provided by communication system 10 can be provisioned using a first alternative in which, when data is to be communicated to a given PSM capable UE (e.g., UE 12), Application Service(s) 42 can subscribe to a "reachability event" trigger via SCEF 40 to a given MME/SGSN serving the UE, say for example, MME 30 serving UE 12. The reachability event trigger can be used to signal to Application Service(s) 42, when UE 12 is about to be available to receive mobile terminated (MT) data (e.g., sending a notification that the "UE will be reachable shortly"). In various embodiments, SCEF 40 can query HSS 18 to determine an MME/SGSN serving a given UE.

In various embodiments, the solutions provided by communication system 10 can be provisioned using a second alternative in which, when data is to be communicated to a given UE (e.g., UE 12), Application Service(s) 42 can "subscribe" to a "deactivate_PSM_at_UE_contact" trigger via SCEF 40 towards MME 30/SGSN 34. For the second alternative, the term "subscribe" is meant to indicate that Application Service(s) 42 may activate functionality for MME 30/SGSN 34 to deactivate PSM for the UE upon MME 30 receiving a TAU or SGSN 34 receiving a RAU from the UE and MME 30/SGSN 34 informing Application Service(s) 42 via SCEF 40 that the UE is reachable or is about to be reachable for sending downlink data. For example, upon deactivating PSM for UE 12, MME 30 can inform Application Service(s) 42 via SCEF 40 that the Application Service(s) can initiate downlink (e.g., MT) data toward the UE. Following any MT communications, Application Service(s) 42 can "unsubscribe" to the "deactivate_PSM_at_UE_contact," which will allow MME 30 to resume PSM for UE 12.

For both the first and second alternatives, it is assumed that MME 30/SGSN 34 and UE 12 are both aware of the PSM Active timer, and at the expiry of PSM Active time, the UE enters a PSM state and hence is not reachable (e.g., not available) for any network initiated communication. As noted above, In various embodiments, SCEF 40 can query HSS 18 to determine an MME/SGSN serving a given UE.

During operation for the first alternative, MME 30/SGSN 34 may monitor a periodic TAU/RAU timer and PSM Active timer for UE 12, which may be the same as a Mobile Reachable Timer (MRT) configured for MME 30/SGSN 34. In various embodiments, MME 30/SGSN 34 may send a notification for the reachability event trigger to Application Service(s) 42 indicating, in essence, that the UE "will be reachable shortly" (e.g., available to receive data within a prescribed time window) either: A) upon determining that the periodic TAU/RAU timer is about to expire or B) upon receipt of a UE initiated service request (SR) or TAU/RAU. In various embodiments, based on whatever MRT that MME 30/SGSN 34 is running, MME 30/SGSN 34 can derive when the UE is expected to perform a next periodic TAU/RAU. With that knowledge, MME 30/SGSN 34 can notify Application Service(s) 42 via SCEF 40 about an impending reachability of the UE just before the expiry of UE's periodic TAU/RAU timer.

In some embodiments, MME 30/SGSN 34 can inform Application Service(s) 42 that it can initiate downlink data within a prescribed time window. In various embodiments, the prescribed time window can indicate when the UE is reachable for network initiated communication(s). In various embodiments, the prescribed time window may be prescribed in a number 'X' seconds. In various embodiments, the time window can be calculated by MME 30/SGSN 34 and provided to Application Service(s) 42. In certain embodiments, MME 30/SGSN 34 can use the UE's periodic TAU/RAU timer value and PSM Active Time to calculate the time window. Thus, in various embodiments, MME 30/SGSN 34 can inform Application Service(s) 42 that it can initiate downlink data within a prescribed time window if the UE performs a normal TAU/RAU (e.g., due to a change in radio/core network properties) or if the UE performs an SR due to unexpected MO data.

In various embodiments, MME 30/SGSN 34 can also disable the trigger. For example, in some cases, the UE may no longer advertise PSM capabilities, in which cases the notifications/triggers may no longer be needed. Accordingly, various combinations may be possible in various embodiments for communicating mobile terminated (MT) data to UE 12 from Application Service(s) during operation including, but not limited to:

A) Application Service(s) 42 sends downlink data and correspondingly the SGW generates DDN towards the MME/SGSN:
  i) If UE 12 becomes reachable (e.g., exits PSM state), MME 30/SGSN 34 can page the UE and UE can send a NAS service request. MME 30/SGSN 34 can then establish the bearer data-path.
  ii) Alternatively, if the periodic TAU/RAU timer expires, UE 12 can initiate a TAU request and MME 30/SGSN 34 can choose to use the TAU/RAU received to establish the data-path on its own.
  iii) In yet another alternative, if UE 12 has initiated NAS service request, the data-path can be established as well.

B) When the data-path is established, Application Service(s) 42 may resume communication with the UE.

While the "reachability event" trigger is subscribed to at the MME/SGSN serving a given UE, if the UE performs mobility TAU/RAU in another MME's/SGSN's area (e.g., the UE enters PSM and then comes out of the PSM in another MME's/SGSN's area), the source MME/SGSN can, in various embodiments, send information about the event trigger (e.g., the AS identity to which the corresponding event trigger needs to be delivered to) as part of a mobility management (MM) context information element (IE) to the target MME/SGSN. The solution provided by the first alternative for communication system 10 may provide a high likelihood of MT data delivery to PSM enabled UE.

For the second alternative, as noted above, MME 30 and UE 12 are both aware of the PSM Active timer and Application Service(s) 42 can subscribe to the a 'deactivate_PSM_at_UE_contact' trigger via SCEF 40 towards MME 30/SGSN 34. During operation, when Application Service(s) 42 needs to send data to UE 12, Application Service(s) 42 can communicate the 'deactivate_PSM_at_UE_contact' to MME 30. When UE 12 communicates its TAU to MME 30, a corresponding Active timer may not be allocated to the UE by MME 30 for at least the duration of the transfer of MT data from Application Service(s) 42. When an Active time is not allocated to UE 12, it may transition to an IDLE mode (e.g., EPS Connection Management-IDLE (ECM-IDLE) mode) but may retain its Access Stratum functions, hence, making it available for paging (e.g., MT signaling) and consequently any MT data. Following deactivating PSM for UE 12, MME 30, via SCEF 40, can send a notification to Application Service(s) 42 indicting that UE 12 is reachable or will be reachable shortly to receive mobile terminated (MT) data from the Application Service(s).

In various embodiments, once Application Service(s) 42 completes its MT data communication towards UE 12 and if the Application Service(s) no longer need the UE to remain active, Application Service(s) can unsubscribe to the 'deactivate_PSM_at_UE_contact' trigger (e.g., subscribe via SCEF 40 to a trigger for MME 30 to enable PSM for UE 12 in a subsequent TAU). This will allow MME 30 to resume PSM for UE 12 at the next normal or periodic TAU communication with the UE. In various embodiments, this can help to avoid unnecessary wasting of battery in the UE if the UE is not required for further data communication by Application Service(s) 42. In various embodiments, subscribing via SCEF 40 to a trigger for MME 30 to enable PSM for UE 12 in a subsequent TAU can include providing an Active time to the UE, thereby enabling the UE to enter PSM upon expiry of the active time. In various embodiments, PSM can be enabled/disabled in a UE by providing an appropriate value (e.g., Active time) in the T3324 information element (IE) [as prescribed in 3GPP TS 24.008 and TS 24.301] in Attach Accept messages, Tracking Area Update Accept messages, etc. Similar functionality can be provided for SGSN 34 for 3G access networks.

It should be noted that the names for the triggers described for the first and second alternatives are provided for illustrative purposes only and are not meant to limit the broad scope of the present disclosure for providing PSM enhancements. Any trigger name or identifier can be provisioned for communication system 10 to achieve the solutions as provided by the first and second alternative and thus are clearly within the scope of the present disclosure.

Accordingly, the solution provided by communication system 10 solves the problem of downlink data loss due to 3GPP Rel-12 PSM feature for UEs. In addition, the solution provides step towards changing a programming paradigm for devices with high latency communication wherein rather than sending downlink data to such devices assuming the data to be delivered, applications ask for device reachability before doing so.

Figure 2:
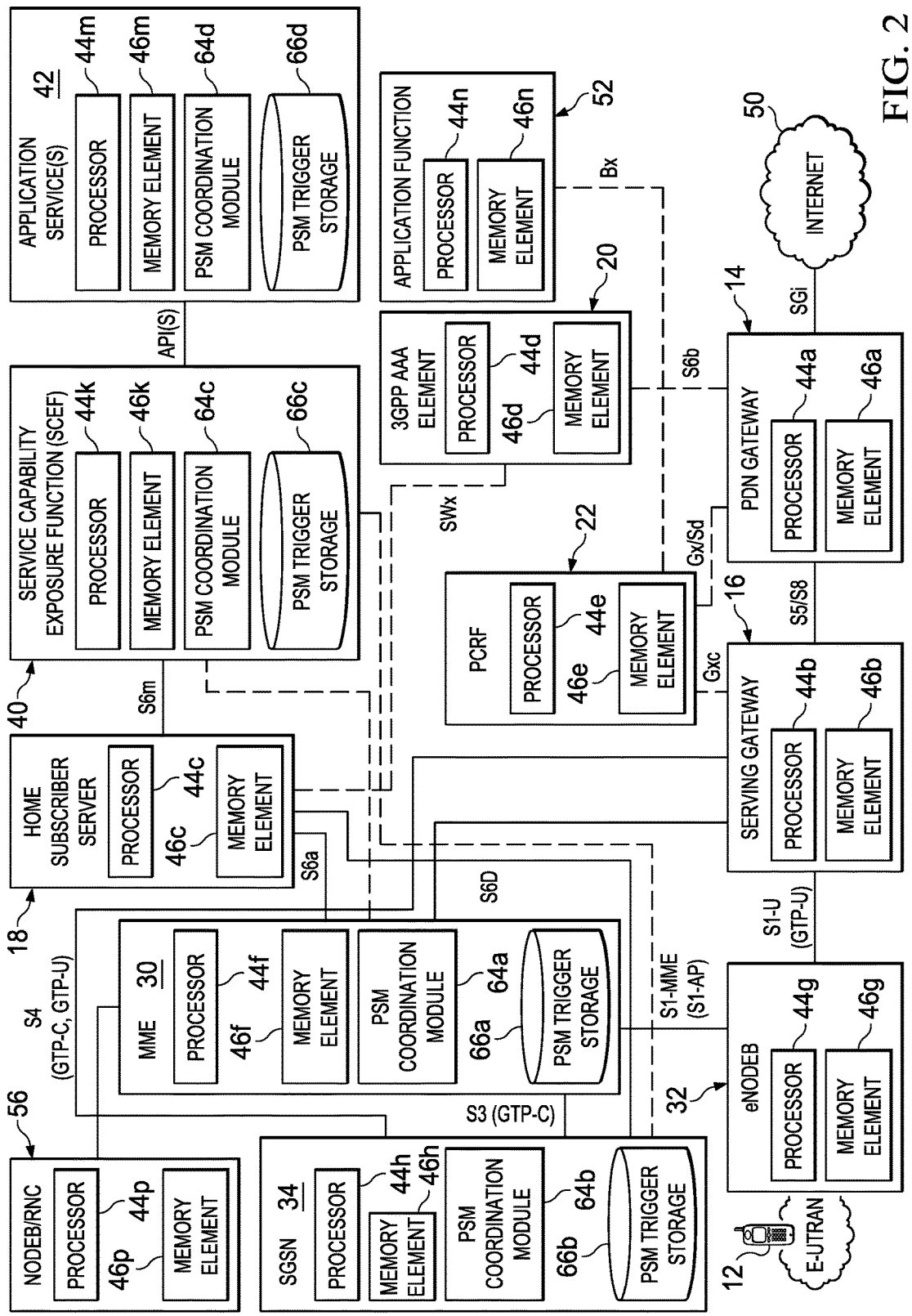
FIG. 2 is a simplified block diagram illustrating additional details associated with one potential embodiment of the communication system.

Turning to FIG. 2, FIG. 2 is a simplified block diagram illustrating additional details associated with one potential embodiment of communication system 10. FIG. 2 includes PGW 14, SGW 16, HSS 18, 3GPP AAA element 20, PCRF 22, MME 30, eNodeB 32, SGSN 34, SCEF 40, Application Service(s) 42, Application Function 52 and NodeB/RNC 56 of communication system 10. Each of these elements may include a respective processor 44a, 44b, 44c, 44d, 44e, 44f, 44g, 44h, 44k, 44m, 44n, 44p and a respective memory element 46a, 46b, 46c, 46d, 46e, 46f, 46g, 46h, 46k, 46m, 46n, 46p. As shown in FIG. 2, MME 30, SGSN 34, SCEF 40 and Application Service(s) 42 may each include a respective PSM coordination module 64a-64d and a respective PSM trigger storage 66a-66d. Also shown in FIG. 2 is UE 12 and internet 50.

In various embodiments, each of MME 30, SGSN 34, SCEF 40 and Application Service(s) 42 may be provisioned and/or configured with one or more event triggers via respective PSM trigger storage 66a-66d, to which Application Service(s) 42 can subscribe to be notified of UE availability to receive traffic from Application Service(s) 42. In various embodiments, the event triggers can also be provisioned in one or more databases, combination thereof or the like that may be provisioned in each of MME 30, SGSN 34, SCEF 40 and Application Service(s) 42, which can overlap or be included with each respective memory element 46f, 46h, 46k, 46m and/or each respective PSM coordination module 64a, 64b, 64c, 64d. In various embodiments, the event triggers can be stored and related to UE based on one or more UE identifiers, such as, for example International Mobile Subscriber Identity (IMSI) identifying a subscriber associated with a given UE, Temporary Mobile Subscriber Identity (TMSI), Mobile Station International Subscriber Directory Number (MSISDN), Anonymous Customer Reference (ACR), combinations thereof or the like. In some cases, an ACR can be used as to identify a subscriber if other identifiers, such as MSISDN, for example, are prevented due to privacy concerns.

Hence, appropriate software and/or hardware is being provisioned in PGW 14, SGW 16, HSS 18, 3GPP AAA element 20, PCRF 22, MME 30, eNodeB 32, SGSN 34, SCEF 40, Application Service(s) 42, Application Function 52 and NodeB/RNC 56 in order to facilitate providing PSM enhancements in the network environment of communication system 10. Note that in certain examples, certain databases can be consolidated with memory elements (or vice versa), or the storage can overlap/exist in any other suitable manner.

In one example implementation, PGW 14, SGW 16, HSS 18, 3GPP AAA element 20, PCRF 22, MME 30, eNodeB 32, SGSN 34, SCEF 40, Application Service(s) 42, Application Function 52 and NodeB/RNC 56 are network elements, which are meant to encompass network appliances, servers, routers, switches, gateways, bridges, loadbalancers, firewalls, processors, modules, or any other suitable device, component, element, or object operable to exchange information that facilitates or otherwise helps to provide for PSM enhancements (e.g., for a network as illustrated in FIG. 1). In other embodiments, these operations and/or features may be provided external to these elements or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information. In some embodiments, DIAMETER routing agents (DRAB) may interface between network elements in order to provide DIAMETER routing procedures for DIAMETER-based messages.

In regards to the internal structure associated with communication system 10, each of PGW 14, SGW 16, HSS 18, 3GPP AAA element 20, PCRF 22, MME 30, eNodeB 32, SGSN 34, SCEF 40, Application Service(s) 42, Application Function 52 and NodeB/RNC 56 can include memory elements [as shown in FIG. 2] for storing information to be used in achieving PSM coordination activities, as outlined herein. Additionally, each of these devices may include a processor [as shown in FIG. 2] that can execute software or an algorithm to perform the PSM coordination activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'.

In various embodiments, information being tracked or sent to PGW 14, SGW 16, HSS 18, 3GPP AAA element 20, PCRF 22, MME 30, eNodeB 32, SGSN 34, SCEF 40, Application Service(s) 42, Application Function 52 and NodeB/RNC 56 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and/or user equipment (e.g., mobile nodes) can also include suitable interfaces for receiving, transmitting, and/or otherwise communicating data or information in a network environment.

Note that in certain example implementations, the PSM coordination techniques as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIG. 2] can store data or information used for the operations described herein. This includes the memory elements being able to store software, logic, code, or processor instructions that are executed to carry out the activities described herein.

A processor can be a hardware processor and can execute any type of instructions associated with the data or information to achieve the PSM coordination operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM)) or an ASIC that includes digital logic, software, code, electronic instructions, or any suitable combination thereof.

Figure 3:
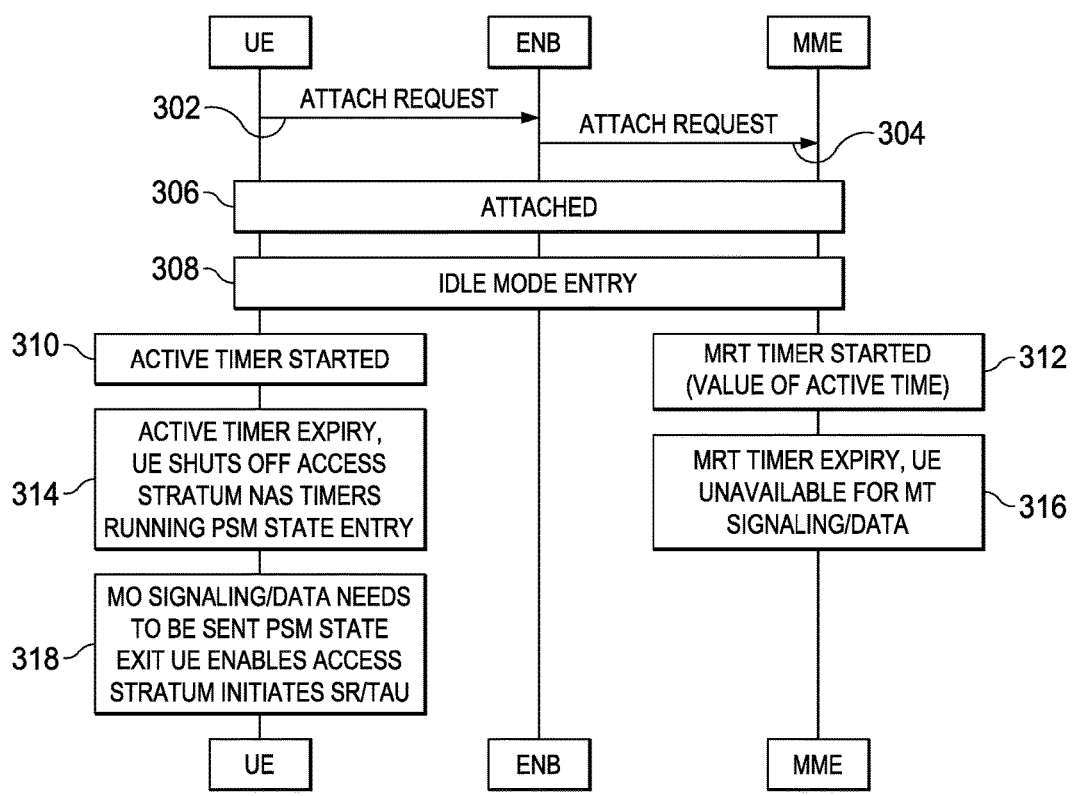
FIGS. 3-4 are simplified flow diagrams illustrating possible example details associated with the communication system.
Figure 4:
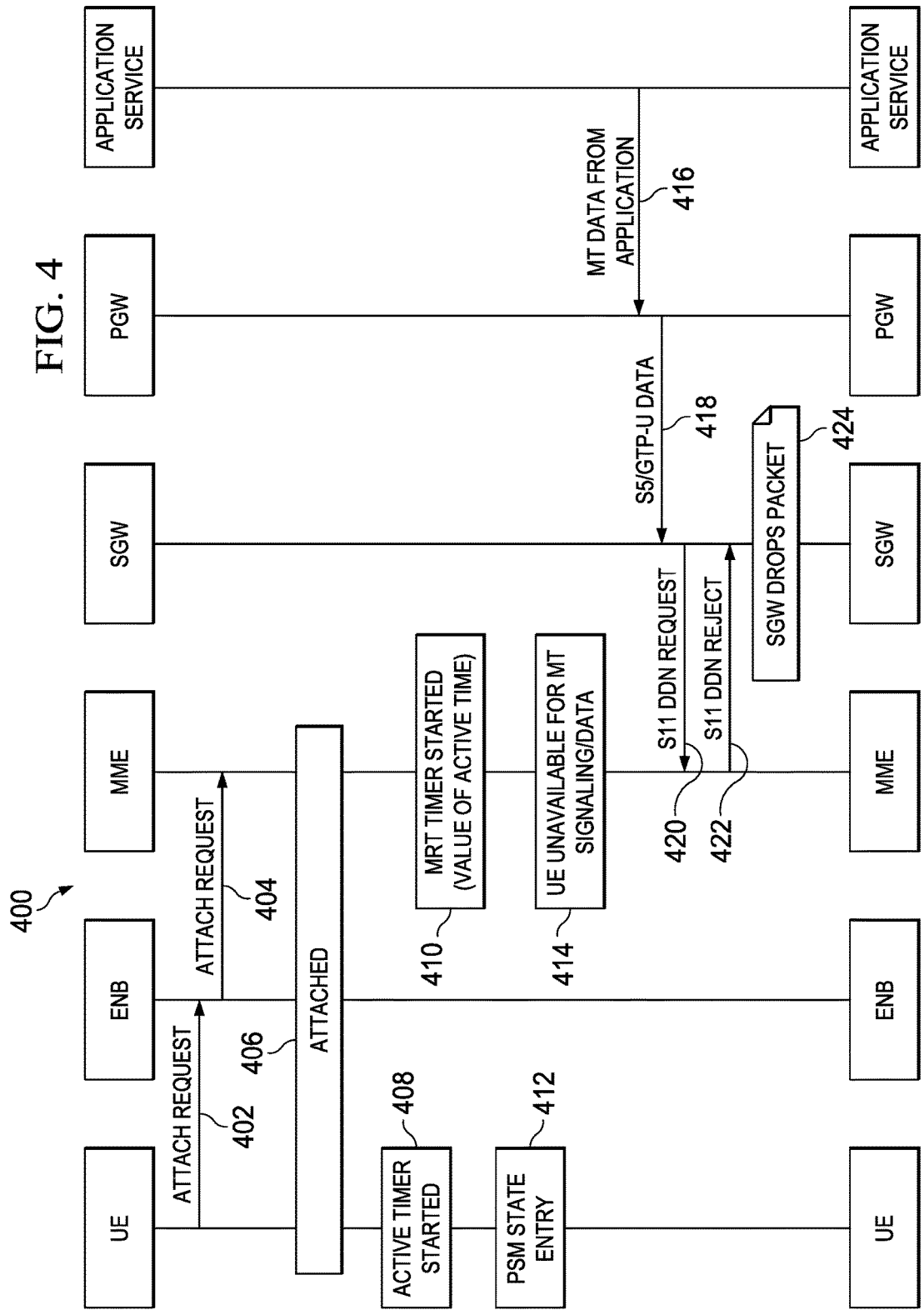

In order to further detail the appropriate operations to achieve the teachings of the present disclosure, reference is now made to FIGS. 3-4. FIG. 3 is a simplified flow diagram 300 illustrating example flows and activities associated with typical PSM signaling between a given PSM capable UE and a given MME. FIG. 4 is a simplified flow diagram 400 illustrating example flows and activities associated with typical PSM signaling for an application service. Such information is offered earnestly and for teaching purposes only and, therefore, should not be construed in any way to limit the broad applications for the present disclosure.

Turning to FIG. 3, at 302, 304 the PSM capable UE communicates an attach request to the MME via a particular eNB. At 306, the UE is attached to the MME and at 308 the UE enters an IDLE mode. At 310, the UE starts an active timer, for an Active time which has been granted by the MME. The UE typically requests an Active time for PSM during an attach and/or tracking area update (TAU). At 312, the MME starts a Mobile Reachable Timer (MRT) (e.g., equal to the value of the Active time). At 314, the Active timer expires for the UE and the UE enters a PSM state; shutting off its access stratum functions while its Non-Access Stratum (NAS) timers for its logical interface with the MME continue to run. At 316, the MRT timer for the MME expires. As noted, upon the UE entering the PSM state, the UE becomes unavailable for mobile terminated (MT) signaling and/or data. At 318, it is assumed that mobile originating (MO) signaling/data needs to be sent for the UE, in which case the UE exits the PSM state, enables Access Stratum functions and initiates a service request (SR) and/or tracking area update (TAU) toward the MME. FIG. 3 illustrates that the UE, upon entering the PSM state, is not immediately reachable for mobile terminated services. Rather, the UE in a PSM state is typically only available for such services for the period of the Active time following an MO event, such as, for example a TAU.

Turning to FIG. 4, FIG. 4 illustrates the rejection of data from a given Application Service (AS), which typically occurs when a PSM capable UE is in a PSM state. At 402, 404, 406 the PSM capable UE communicates an attach request to the MME via a particular eNB and attaches to the MME similar 302, 304, 306 as shown in FIG. 3. At 408, the UE starts an active timer, for an Active time which has been granted to the UE by the MME. At 410, the MME starts a Mobile Reachable Timer (MRT) (e.g., equal to the value of the Active time). At 412, the Active timer expires for the UE and the UE enters a PSM state. While the UE is in the PSM state, it is unavailable for mobile terminated (MT) signaling from the MME, as shown at 414.

It is assumed that the Application Service desires to communicate MT data to the UE at 416, which is communicated to a given PGW. The PGW converts the MT data to S5/GTP-U (GTP user plane) data, which is communicated to a given SGW at 418. At 420, the SGW, in turn, initiates an S11 downlink data notification (DDN) request to the MME. Because the MME is unable to relay MT signaling/data to the UE, which is in the PSM state, the MME responds to the request with a DDN rejection at 422. Following the rejection, at 424 the SGW drops the packet(s) associated with the MT data from the Application Service. Thus, as shown in FIG. 4, current techniques for handling downlink reachability typically involve dropping of UE packets/data.

Figure 5A:
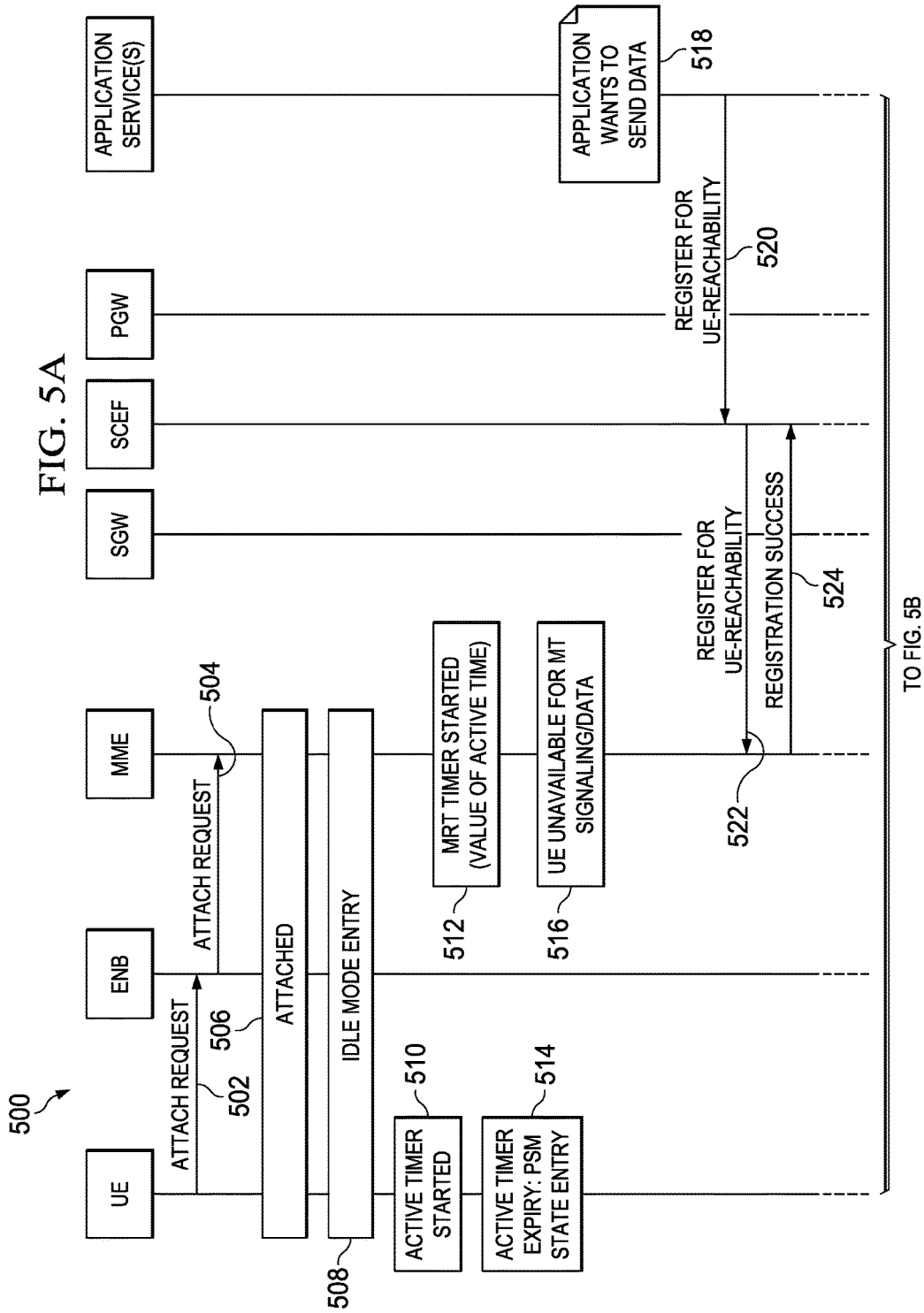
FIGS. 5A-5B are simplified flow diagrams illustrating potential flows and activities associated with providing PSM enhancements in accordance with one potential embodiment of the communication system.
Figure 5B:
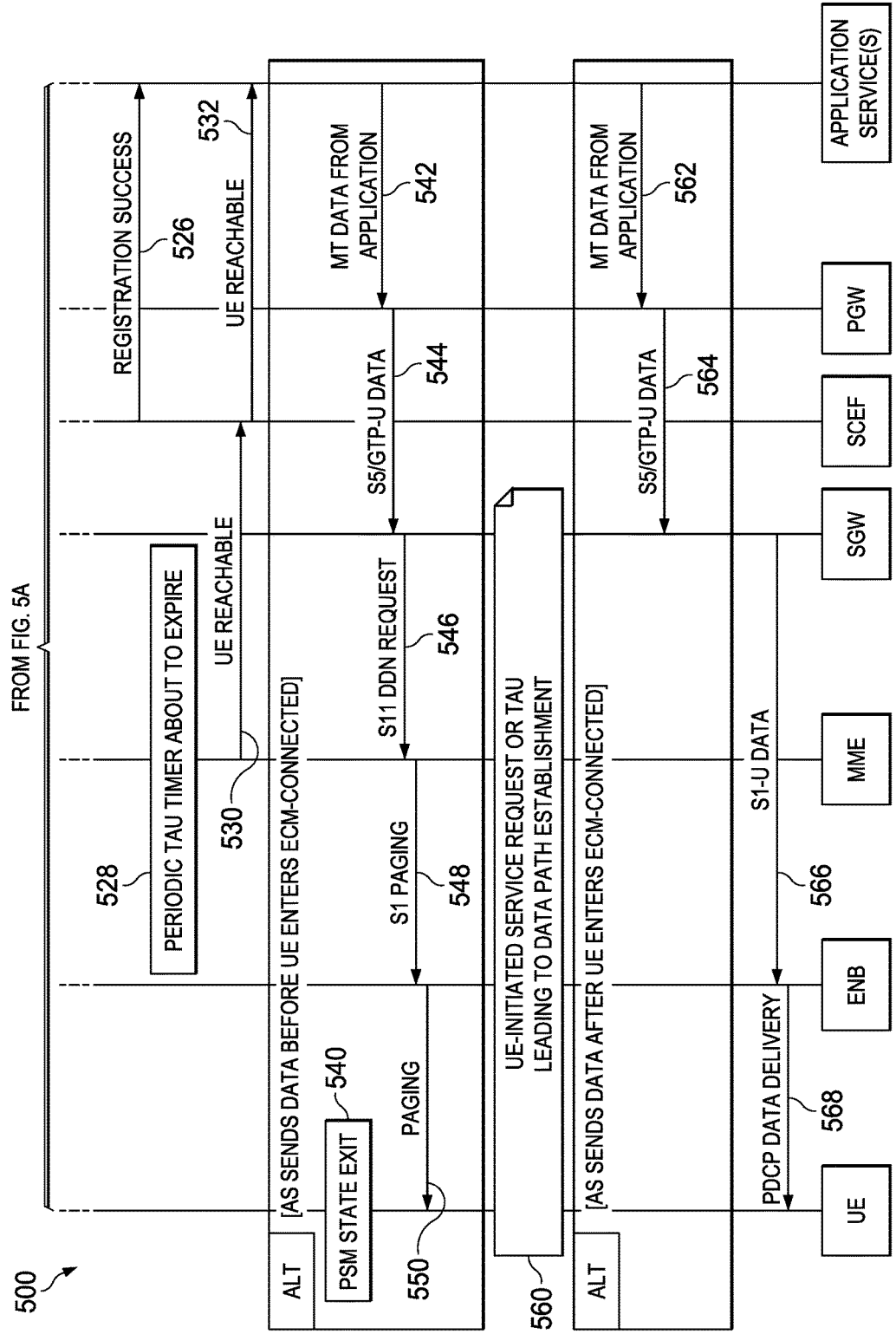

Turning to FIGS. 5A-5B, FIGS. 5A-5B are simplified flow diagrams 500 illustrating example flows and activities associated with providing PSM enhancements in a network environment in accordance with one potential embodiment of communication system 100. In general, FIGS. 5A-5B illustrate example flows and activities associated with embodiments for a first sub-alternative to the first alternative of the solutions provided by communication system 10 in which MME 30 may be configured to communicate an indication to Application Service(s) (AS) 42 that UE 12 is reachable or is about to be reachable within a prescribed time window upon MME 30 determining that a periodic TAU timer for UE 12 is about to expire. It should be noted that although the flows and activities shown in FIGS. 5A-5B are illustrated with respect to E-UTRAN communications, the flows and activities can be equally applied to GERAN/UTRAN communications via NodeB/RNC 56 and SGSN 34.

At 502, UE 12 communicates an attach request to eNB 32, which communicates the attach request to MME 30 at 504. At 506, UE 12 is attached to MME 30. At 508, UE 12 enters an ECM-IDLE mode. At 510, the Active timer for UE 12 is started and at 512 the Mobile Reachable Timer (MRT) for MME 30 is started. At 514, the Active timer for UE 12 expires and the UE enters a PSM state; shutting off its access stratum functions while its Non-Access Stratum (NAS) timers for the logical interface with MME 30 continue to run. At 516, UE 12 is unavailable for mobile terminated (MT) signaling and/or data from MME 30.

At 518, it is assumed that Application Service(s) 42 desires to send mobile terminated (MT) data to UE 12. At 520, 522, Application Service(s) 42 registers to a UE reachability indication (e.g., an availability indication) to be received from MME 30 to indicate when or approximately when (e.g., within a prescribed window) UE 12 is reachable to receive data from Application Service(s) 42. The registration may be communicated directly to MME 30 via SCEF 40, as shown at 522. In various embodiments, SCEF 40 can query HSS 18 to determine the MME (MME 30) serving UE 12, though this is not shown in FIG. 5A in order to illustrate other features of communication system 10. At 524, 526, MME 30 may respond to the request via SCEF 40 with an indication that the registration was a success. In various embodiments, the registering can include Application Service(s) 42 subscribing to a "reachability event" trigger for MME 30, which, upon triggering by MME 30, can be used to indicate that UE 12 is reachable or is about to become reachable to receive data from Application Service(s) 42.

Continuing to FIG. 5B, at 528, MME 30 determines that a periodic TAU timer for UE 12 is about to expire (e.g., based on the MRT timer started at 512 that may be about to expire). Based on the determination, MME 30 communicates an indication to Application Service(s) 42 via SCEF 40 at 530, 532 that indicates that the UE is reachable or is about to become reachable within a prescribed time window.

Two options for communicating mobile terminated (MT) data to UE 12 are shown in FIG. 5B. For a first option, Application Service(s) 42 sends the data to the UE before the UE enters an ECM-CONNECTED mode. The first option is illustrated at 540-550. For a second option, Application Service(s) 42 sends the data to the UE after the UE enters an ECM-CONNECTED mode. The second option is illustrated at 562-564.

For the first option, it is assumed that UE 12 exits its PSM state at 540, but a data path with MME 30 is not be established before Application Service(s) 42 communicates the MT data to PGW 14 at 542 (e.g., Application Service(s) 42 generates one or more messages including the data to communicate to PGW 14). At 544, PGW 14 converts the MT data to S5/GTP-U data, which is communicated to SGW 16. At 546, SGW 16 communicates an S11 downlink data notification (DDN) request to MME 30. At 548, 550 MME 30 initiates S1 paging to UE 12 via eNB 32 to cause the UE to initiate a NAS service request as shown at 560 leading to data path establishment with MME 30. Following the data path establishment, SGW 16 may convert the S5/GTP-U data to S1-U data, which may be communicated to eNB 32 at 566. At 568, eNB 32 communicates the data to UE 12 utilizing Packet Data Convergence Protocol (PDCP) data delivery techniques.

For the second option, it is assumed that UE 12 either initiates a NAS service request (e.g., due to unexpected MO data) or tracking area update as shown at 560 leading to data path establishment with MME 30. For this option, Application Service(s) 42 communicates the MT data to PGW 14 at 562 (e.g., Application Service(s) 42 generates one or more messages including the data to communicate to PGW 14). At 564, PGW 14 converts the MT data to S5/GTP-U data, which is communicated to SGW 16. Because a data path is established between UE 12 and MME 30 for the second option, no paging may be necessary and SGW 16 may convert the S5/GTP-U data to S1-U data, which may be communicated to eNB 32 at 566. At 568, eNB 32 communicates the data to UE 12 utilizing Packet Data Convergence Protocol (PDCP) data delivery techniques. It should be understood that although the flows and activities shown in FIGS. 5A-5B are illustrated with respect to E-UTRAN communications, the flows and activities can be equally applied to GERAN/UTRAN communications via NodeB/RNC 56 and SGSN 34 for periodic RAU timers.

Figure 6A:
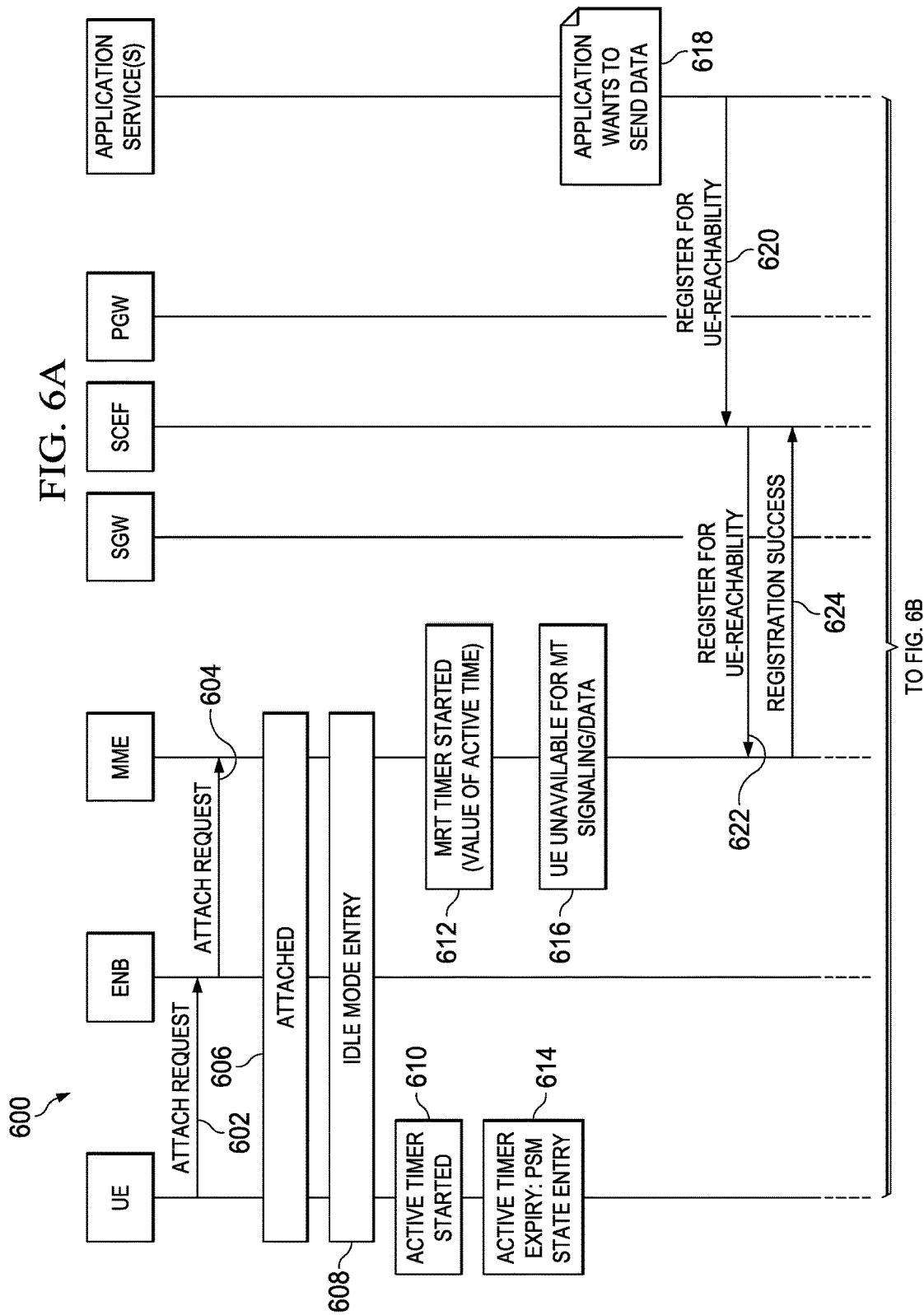
FIGS. 6A-6B are simplified flow diagrams illustrating other potential flows and activities associated with providing PSM enhancements in accordance with one potential embodiment of the communication system.
Figure 6B:
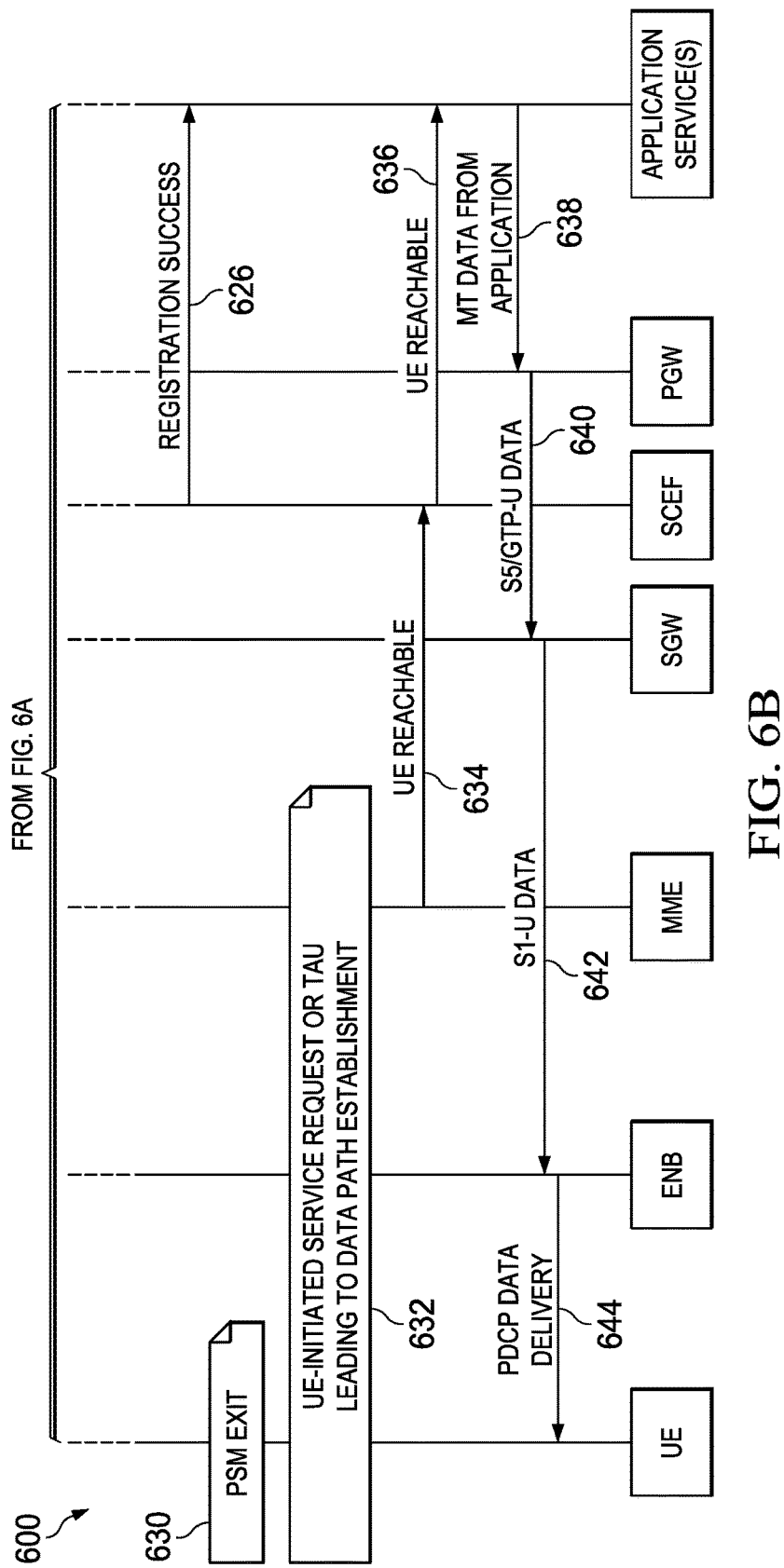

Turing to FIGS. 6A-6B, FIGS. 6A-6B are simplified flow diagrams 600 illustrating other example flows and activities associated with providing PSM enhancements in a network environment in accordance with one potential embodiment of the communication system. In general, FIGS. 6A-6B illustrates example flows and activities associated with embodiments for a second sub-alternative to the first alternative of the solutions provided by communication system 10 in which MME 30 may be configured to communicate an indication to Application Service (AS) 42 that UE 12 is reachable or is about to be reachable within a prescribed time window upon MME 30 receiving mobile originated (MO) data from UE 12 for a UE initiated service request or TAU. Thus, the flows and activities shown in flow diagrams 600 differ from the example flows and activities shown in FIGS. 5A-5B primarily with regard to the timing in which MME 30 communicates an indication to Application Service(s) (AS) 42 indicating that UE 12 is reachable or is about to be reachable by Application Service(s) 42. In FIGS. 6A-6B, MME 30 communicates an indication to Application Service(s) 42 that UE 12 is reachable or is about to be reachable after receiving a UE initiated service request or TAU as opposed to FIGS. 5A-5B, which illustrates that MME 30 communicates an indication that UE 12 is reachable or is about to be reachable upon determining that the periodic TAU timer for UE 12 is about to expire.

Accordingly, the flows and activities shown at 602-626 for FIGS. 6A-6B are similar to the corresponding flows and activities shown at 502-526 for FIGS. 5A-5B. At 630 for FIG. 6B UE 12 exits its PSM state. At 632, a UE initiated service request or TAU is communicated from UE 12 to MME 30, which leads to data path establishment between UE 12 and MME 30 also at 632 for the UE 12 ECM-CONNECTED mode. At 634, 636, MME 30 communicates a notification to Application Service(s) 42 via SCEF 40 indicating that UE 12 is reachable. In various embodiments, the notification may include an indication of a time window for which UE 12 is reachable. For example, as MME 30 is tracking the PSM-related Active time associated with the UE, it may be capable of including in any UE reachable communications with Application Service(s) 42 the time window in which the Application Service(s) 42 may restart communications with the UE. In some embodiments, including the time window of when the UE is reachable in communications with Application Service(s) 42 may provide an advantage of allowing Application Service(s) 42 to space-out or vary communications with the UE according to the time window.

At 638 mobile terminated (MT) data from Application Service(s) 42 may be communicated to PGW 14 (e.g., Application Service(s) 42 generates one or more messages including the data to communicate to PGW 14). At 640, PGW 14 converts the MT data to S5/GTP-U (GTP user plane) data, which is communicated to SGW 16. Because UE 12 is an ECM-CONNECTED mode, SGW 16 converts the S5/GTP-U data to S1-U data, which is communicated to eNB 32 at 642. At 644, eNB 32 communicates the data to UE 12 utilizing Packet Data Convergence Protocol (PDCP) data delivery techniques. It should be understood that although the flows and activities shown in FIGS. 6A-6B are illustrated with respect to E-UTRAN communications, the flows and activities can be equally applied to GERAN/UTRAN communications via NodeB/RNC 56 and SGSN 34 for periodic RAU timers.

Turning to FIG. 7, FIG. 7 is a simplified flow diagram 700 illustrating yet other example flows and activities associated with providing PSM enhancements in a network environment in accordance with one potential embodiment of the communication system. FIG. 7 illustrates example flows and activities associated with embodiments of the second alternative for the solutions provided by communication system 10 in which Application Service(s) 42 indicate to MME 30 to deactivate PSM for UE 12 at a next tracking area update (TAU) in order to communicate MT data from Application Service(s) 42 to UE 12.

At 702, it is assumed that UE 12 is attached to MME 30 and at 704 that UE 12 enters an ECM-IDLE mode. At 706, the Active timer for UE 12 is started and at 708 the Mobile Reachable Timer (MRT) for MME 30 is started. At 710, the Active timer for UE 12 expires and the UE enters a PSM state; shutting off its access stratum functions while its Non-Access Stratum (NAS) timers for the logical interface with MME 30 continue to run. At 712, UE 12 is unavailable for mobile terminated (MT) signaling and/or data from MME 30.

At 714, it is assumed that Application Service(s) 42 desires to send data to UE 12. According to a particular embodiment, Application Service(s) 42 registers with MME 30 at 716, 718 to deactivate PSM for UE 12 at the next TAU for UE 12. In various embodiments, the registering can include subscribing to a trigger toward MME 30 indicating to deactivate PSM for UE 12. As shown at 718, the registering is performed via SCEF 40, which may communicate directly with MME 30 for the registering.

At 720, it is assumed that UE 12 exits its PSM state. At 722, UE 12 initiates a TAU procedure with MME 30 and MME 30, upon determining that the TAU for UE 12 has been received, deactivates PSM for UE 12 and re-establishes a data path with the UE. At 724, MME 30 communicates an indication to Application Service(s) 42 via SCEF 40 (at 726) indicating that the UE is reachable or is about to become reachable within a prescribed time window.

At 728 mobile terminated (MT) data from Application Service(s) 42 may be communicated to PGW 14 (e.g., Application Service(s) 42 generates one or more messages including the data to communicate to PGW 14). At 730, PGW 14 converts the MT data to S5/GTP-U (GTP user plane) data, which is communicated to SGW 16. SGW 16 converts the S5/GTP-U data to S1-U data, which is communicated to eNB 32 at 732. At 734, eNB 32 communicates the data to UE 12 utilizing Packet Data Convergence Protocol (PDCP) data delivery techniques. In certain embodiments, MME 30 can re-activate or re-enable the PSM for UE 12 following the communication of MT data to UE 12 from Application Service(s) 42. In various embodiments, Application Service(s) 42 can re-enable PSM for UE 12 upon completing its transfer of data to UE and if Application Service(s) 42 no longer need UE 12 to remain active. In various embodiments, re-enabling PSM for UE 12 can include subscribing via SCEF 40 to a trigger for MME 30 to enable PSM for UE 12 in a subsequent TAU can include providing an Active time to the UE, thereby enabling the UE to enter PSM upon expiry of the active time. In various embodiments, PSM can be enabled/disabled in a given UE by providing an appropriate value (e.g., Active time) in the T3324 information element (IE) in an Attach Accept message and/or a Tracking Area Update Accept message communicated from MME 30 to UE 12. It should be understood that although the flows and activities shown in FIG. 7 are illustrated with respect to E-UTRAN communications, the flows and activities can be equally applied to GERAN/UTRAN communications via NodeB/RNC 54 and SGSN 34 for periodic RAU timers.

Note that in this Specification, references to various features (e.g., elements, structures, modules, components, steps, operations, characteristics, etc.) included in 'one embodiment', 'example embodiment', 'certain embodiment', 'an embodiment', 'another embodiment', 'some embodiments', 'various embodiments', 'other embodiments', 'certain embodiments', 'alternative embodiment', and the like are intended to mean that any such features are included in one or more embodiments of the present disclosure, but may or may not necessarily be combined in the same embodiments. Note also that a module as used herein in this Specification, can be inclusive of an executable file comprising instructions that can be understood and processed on a computer, and may further include library modules loaded during execution, object files, system files, hardware logic, software logic, or any other executable modules.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network flows, and signaling protocols, communication system 10 may be applicable to other exchanges, routing protocols, or routed protocols to provide PSM enhancements in a network environment. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   registering, by an application service, to receive a notification indicating an availability of a user equipment (UE) to receive data from the application service and wherein the registering is performed via a service capability exposure function (SCEF);
   receiving an indication from the UE that the UE is available to receive data;
   notifying the application service that the UE is available to receive the data based on receiving the indication; and
   communicating the data from the application service to the UE.

2. The method of claim 1, wherein the application service registers for the notification with a Mobility Management Entity (MME) or a serving General Packet Radio Service (GPRS) support node (SGSN).

3. The method of claim 2, wherein the registering includes subscribing by the application service to an event trigger for the MME or the SGSN.

4. The method of claim 1, wherein the indication received from the UE is at least one of:
   a service request received from the UE;
   a routing area update received from the UE; and
   a tracking area update received from the UE.

5. The method of claim 1, wherein the notification indicates a time window for which the UE is available to receive the data.

6. The method of claim 1, further comprising:
   communicating a registration success to the application service that indicates that the registration is successful.

7. The method of claim 1, further comprising:
   establishing a data path for the UE prior to the communicating.

8. One or more non-transitory tangible media encoding logic that includes instructions for execution by a processor, wherein execution of the instructions causes the processor to perform operations comprising:
   registering, by an application service, to receive a notification indicating an availability of a user equipment (UE) to receive data from the application service and wherein the registering is performed via a service capability exposure function (SCEF);
   receiving an indication from the UE that the UE is available to receive data;

notifying the application service that the UE is available to receive the data based on receiving the indication; and communicating the data from the application service to the UE.

9. The media of claim 8, wherein the application service registers for the notification with a Mobility Management Entity (MME) or a serving General Packet Radio Service (GPRS) support node (SGSN).

10. The media of claim 9, wherein the registering includes subscribing by the application service to an event trigger for the MME or the SGSN.

11. The media of claim 8, wherein the indication received from the UE is at least one of:

a service request received from the UE;
a routing area update received from the UE; and
a tracking area update received from the UE.

12. The media of claim 8, wherein the notification indicates a time window for which the UE is available to receive the data.

13. The media of claim 8, wherein the execution causes the processor to perform further operations, comprising:

communicating a registration success to the application service that indicates that the registration is successful.

14. The media of claim 8, wherein the execution causes the processor to perform further operations, comprising:

establishing a data path for the UE prior to the communicating.

15. A system comprising:

at least one memory element for storing data; and
at least one processor for executing instructions associated with the data, wherein executing the instructions causes the system to perform operations, comprising:

registering, by an application service, to receive a notification indicating an availability of a user equipment (UE) to receive data from the application service and wherein the registering is performed via a service capability exposure function (SCEF);

receiving an indication from the UE that the UE is available to receive data;

notifying the application service that the UE is available to receive the data based on receiving the indication; and communicating the data from the application service to the UE.

16. The system of claim 15, wherein the application service registers for the notification with a Mobility Management Entity (MME) or a serving General Packet Radio Service (GPRS) support node (SGSN).

17. The system of claim 16, wherein the registering includes subscribing by the application service to an event trigger for the MME or the SGSN.

18. The system of claim 15, wherein the indication received from the UE is at least one of:

a service request received from the UE;
a routing area update received from the UE; and
a tracking area update received from the UE.

19. The system of claim 15, wherein the notification indicates a time window for which the UE is available to receive the data.

20. The system of claim 15, wherein the executing causes the system to perform further operations, comprising:

communicating a registration success to the application service that indicates that the registration is successful.

* * * * *